US007843462B2

(12) United States Patent
Poon

(10) Patent No.: US 7,843,462 B2
(45) Date of Patent: Nov. 30, 2010

(54) SYSTEM AND METHOD FOR DISPLAYING A DIGITAL VIDEO SEQUENCE MODIFIED TO COMPENSATE FOR PERCEIVED BLUR

(75) Inventor: Eunice Poon, Scarborough (CA)

(73) Assignee: Seiko Epson Corporation, Tokyo (JP)

( * ) Notice: Subject to any disclaimer, the term of this patent is extended or adjusted under 35 U.S.C. 154(b) by 685 days.

(21) Appl. No.: 11/852,133

(22) Filed: Sep. 7, 2007

(65) Prior Publication Data

US 2009/0067509 A1    Mar. 12, 2009

(51) Int. Cl.
*G06T 1/60* (2006.01)
*G06T 11/40* (2006.01)
*G09G 5/36* (2006.01)
*G09G 5/00* (2006.01)
*H04N 9/64* (2006.01)
*H04N 1/46* (2006.01)
*G06K 9/46* (2006.01)
*G09G 5/02* (2006.01)
*H04N 1/40* (2006.01)
*H04N 7/26* (2006.01)
*H04N 7/64* (2006.01)
*G06K 9/40* (2006.01)

(52) U.S. Cl. ................ 345/582; 345/530; 345/548; 345/602; 345/552; 348/251; 348/241; 348/615; 348/208.13; 358/524; 358/533; 358/461; 382/236; 382/254; 382/264; 382/274

(58) Field of Classification Search .......... 345/418, 345/581–582, 589, 600–602, 611, 612, 618, 345/530, 545, 536–538, 547, 552, 548, 555; 348/155, 352, 251, 241, 407, 430, 497, 533, 348/578, 615, 699, 607; 358/524–525, 532–533; 375/240.26; 382/255
See application file for complete search history.

(56) References Cited

U.S. PATENT DOCUMENTS

| 5,764,787 | A | 6/1998 | Nickerson |
| 6,026,232 | A * | 2/2000 | Yogeshwar et al. ......... 715/719 |
| 6,496,538 | B1 | 12/2002 | Drysdale |
| 6,549,576 | B1 | 4/2003 | Moriyoshi |
| 6,707,853 | B1 | 3/2004 | Cook et al. |
| 6,778,607 | B2 | 8/2004 | Zaccarin et al. |
| 6,842,483 | B1 | 1/2005 | Au et al. |
| 7,054,500 | B1 * | 5/2006 | Lillevold .................... 382/260 |
| 7,596,280 | B2 * | 9/2009 | Bilbrey et al. ............... 382/274 |
| 2004/0190617 | A1 * | 9/2004 | Shen et al. ............. 375/240.16 |

(Continued)

*Primary Examiner*—Sajous Wesner
(74) *Attorney, Agent, or Firm*—Mark P. Watson

(57) ABSTRACT

A system for displaying a digital video sequence includes a graphics processing unit (GPU) and a display device. The GPU receives and modifies the digital video sequence to compensate for perceived blur based on motion between frames of the digital video sequence. The display device displays the modified digital video sequence. A method and computer readable medium having computer readable code is also provided.

21 Claims, 7 Drawing Sheets

U.S. PATENT DOCUMENTS

| | | |
|---|---|---|
| 2004/0227763 A1 | 11/2004 | Wichman et al. |
| 2004/0247029 A1 | 12/2004 | Zhong et al. |
| 2004/0264570 A1 | 12/2004 | Kondo et al. |
| 2005/0179814 A1 | 8/2005 | Pau et al. |
| 2005/0190844 A1 | 9/2005 | Kadono et al. |
| 2005/0265454 A1 | 12/2005 | Muthukrishnan et al. |
| 2006/0002474 A1 | 1/2006 | Au et al. |
| 2006/0056513 A1 | 3/2006 | Shen et al. |
| 2006/0056708 A1 | 3/2006 | Shen et al. |
| 2006/0067406 A1 | 3/2006 | Kitada et al. |
| 2006/0109910 A1 | 5/2006 | Nagarajan |
| 2006/0120612 A1 | 6/2006 | Manjunath et al. |
| 2006/0126739 A1 | 6/2006 | Stoner |
| 2006/0182356 A1* | 8/2006 | Lillevold .................... 382/236 |
| 2006/0280249 A1* | 12/2006 | Poon ...................... 375/240.16 |
| 2008/0004073 A1* | 1/2008 | John et al. ................ 455/556.1 |
| 2009/0256918 A1* | 10/2009 | Rabinowitz et al. ...... 348/208.4 |
| 2010/0214448 A1* | 8/2010 | Ouzilevski et al. ..... 348/231.99 |

* cited by examiner

| PROGRAM | TEXTURE | | | | | | | | | | | | |
|---|---|---|---|---|---|---|---|---|---|---|---|---|---|
| | m_pFb[0] | | | | m_pFb[1] | | | mpegTexID | overdriveTexID | vectormapTexID | SCREEN |
| | 0 | 1 | 2 | 3 | 0 | 1 | 2 | | | | |
| RGB2GRAY | | ▲ | | | | | | ● | | | |
| ABSDIFF_0 | ● | ● | | ▲ | | | | | | | |
| SUMDIFF_0 | | | | ● | ▲ | | | | | | |
| ABSDIFF_1 | ● | ● | | ▲ | | | | | | | |
| SUMDIFF_1 | | | | ● | | ▲ | | | | | |
| ABSDIFF_2 | ● | ● | | ▲ | | | | | | | |
| SUMDIFF_2 | | | | ● | ● | ● | ▲ | | | | |
| VECMEDIAN | | | | ▲ | ● | ▲ | ● | | | | |
| VECMAP | | | | ▲ | | ● | | | | | |
| IMGGRAD | ● | ● | ▲ | | | | | | | | |
| SETWEIGHT | | ▲ | ● | ● | | | | | | | |
| SIMBLUR | | ● | ▲ | ▲ | | | | | | | |
| UPDATE | | ▲ | ● | ● | | | | | | | |
| SHARPEN | | ● | ▲ | ● | | | | | | | |
| OVERDRIVE | | ● | ● | | | | | | ▲ | | |
| GRAY2RGB | | ● | | | | | | | | | ● | ▲ |

● TEXTURE SOURCE ▲ RENDER TARGET

*FIG. 5*

FIG. 7A
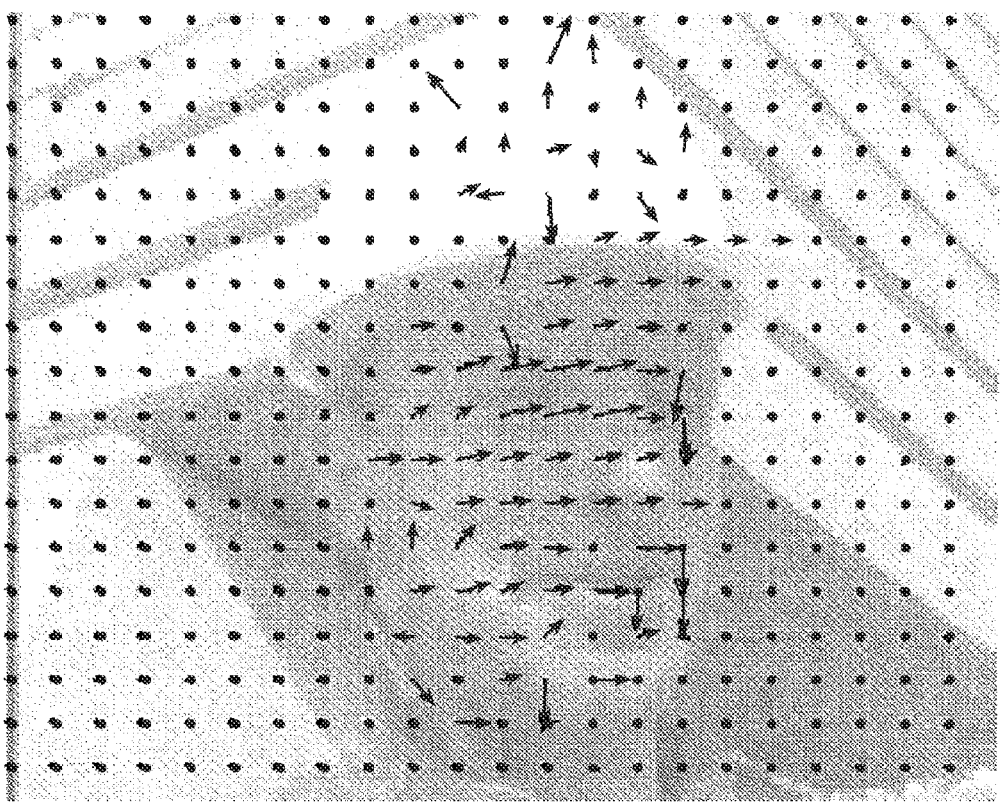
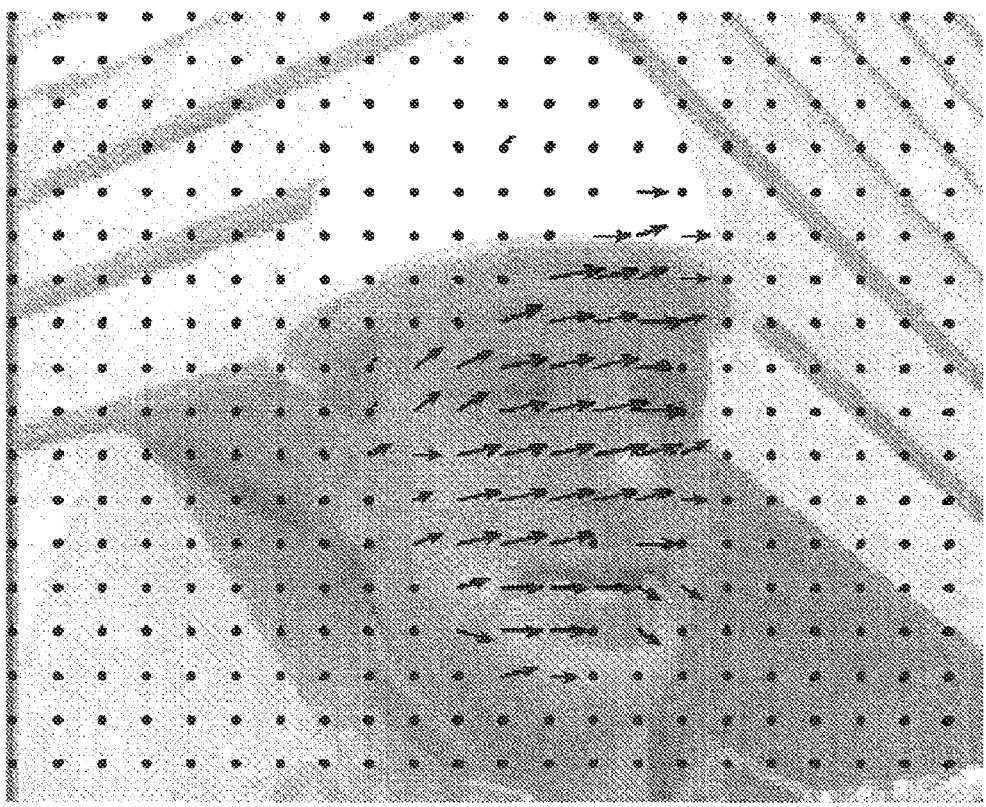
FIG. 7B

| Frame Size | CPU | | GPU | | GPU/CPU Ratio |
|---|---|---|---|---|---|
| | Time Per Frame (ms) | Frame Rate (fps) | Time Per Frame (ms) | Frame Rate (fps) | |
| 176 x 244 | 40.17 | 24.89 | 15.56 | 64.25 | 2.58 |
| 256 x 192 | 77.70 | 12.87 | 35.01 | 28.56 | 2.22 |
| 320 x 240 | 115.21 | 8.68 | 48.07 | 20.80 | 2.40 |
| 352 x 240 | 138.79 | 7.21 | 47.36 | 21.12 | 2.93 |
| 640 x 480 | 527.80 | 1.89 | 177.99 | 5.62 | 2.97 |

| Task | GPU Processing Time (msec) | CPU Processing Time (msec) |
|---|---|---|
| Colorspace Conversion | 0.27 | 2.09 |
| Motion Estimation | 17.41 | 71.17 |
| Motion Blur Compensation | 24.52 | 20.81 |
| Motion Sharpening | 1.27 | 2.52 |
| Overdrive | 0.52 | 14.59 |
| Frame Display | 4.07 | 4.04 |
| | 48.07 | 115.21 |

SYSTEM AND METHOD FOR DISPLAYING A DIGITAL VIDEO SEQUENCE MODIFIED TO COMPENSATE FOR PERCEIVED BLUR

FIELD OF THE INVENTION

The present invention relates generally to image processing and more particularly to a method and system for displaying a digital video sequence modified to compensate for perceived blur.

BACKGROUND OF THE INVENTION

Moving objects in digital video displayed on a hold-type display device such as a liquid crystal display (LCD) device can appear blurry to an observer. The perceived blur is known to be caused in part by the relatively slow LC response of the liquid crystal cells. When compared with an impulse-type device such as a cathode ray tube (CRT) device, for example, an LCD device has a much slower brightness transition response time. The perceived blur is also caused in part by prolonged light emission inherent in the sample-and-hold driving technique commonly employed by LCD devices, which results in formation of after-images on the human retina. These after-images produce a blurred visual perception as the video sequence is being observed.

Various methods have been proposed to compensate for perceived blur. These include methods that modify the hold-type device itself (for example by black frame insertion or backlight blinking), and those that pre-process frames of the digital video sequence prior to display on the hold-type device in order to compensate for motion blur (such as low-pass filtering, or inverse filtering).

U.S. Patent Application Publication No. 2005/0265454 to Muthukrishnan et al. discloses a motion estimation algorithm for predictive coding of a digital video stream. A best match of a given block in a current frame is found by identifying a set of predictor search points in a reference frame based on a median vector of an adjacent, already-coded macro block, a zero motion vector, a temporally co-located macroblock, surrounding macroblock motion vectors and a global motion vector. A Sum of Absolute Difference (SAD) between the given block and each reference block in the reference frame that is centered on the respective predictor points is then calculated. The predictor point corresponding to the lowest SAD is then used as the center of a further diamond search within a given pixel range to identify a better match (i.e., one that yields a lower SAD). If a better match is found, a diamond search within a reduced pixel range is conducted about the center of the better match. The process continues with progressively reduced pixel ranges for a predetermined number of iterations, or until the minimum SAD stays at the center of a current diamond search. The motion vector for the given block is then deemed to correspond to the center of the last diamond search.

U.S. Patent Application Publication Nos. 2006/0056513 and 2006/0056708 to Shen et al. disclose a method for accelerating video encoding using both a central processing unit (CPU) to encode the video and a graphics processing unit (GPU) to perform motion estimation for use during the encoding. A particular video frame is identified by the CPU and provided to the GPU for processing. The GPU conducts motion estimation using block matching, during which reference pixel blocks within a search window are compared with a current pixel block in the current frame to find a reference pixel block yielding a minimum SAD. The motion vector representing motion estimation of a pixel block is provided by the GPU to the CPU in order to encode the current frame into a digital video data stream. A depth buffer is employed by the GPU to accelerate motion estimation.

U.S. Pat. No. 5,764,787 to Nickerson discloses a method of estimating motion between successive video frames during encoding of the video frames into a video stream. During the method, a current pixel block in a current frame is compared using SAD or Sum of Squares of Differences (SSD) with a plurality of reference pixel blocks within a search window in a reference frame to determine a best match. Only half of the pixels in the current pixel block, distributed in a checkerboard pattern, are compared thereby to reduce computational load.

U.S. Pat. No. 6,496,538 to Drysdale discloses a method and apparatus for estimating motion between video frames during encoding of a set of video frames. During the method, a first macroblock from a video frame in the set is compared to a second macroblock in a reference video frame to determine a differential value. The differential value is then compared to a comparison value. If the differential value is no smaller than the comparison value, the differential value is compared to a minimal differential value. If the differential value is less than or equal to the minimal differential value, the differential value is stored as the new minimal differential value, thereby to establish a better macroblock match.

U.S. Pat. No. 6,549,576 to Moriyoshi discloses a method for detecting motion vectors between blocks of pixels in frames for compression coding a digital video sequence. During the method, a current image is divided into pixel blocks and the difference in position between each pixel block in the current image and its best match in a search range of a reference image is determined. A motion vector for a pixel block residing in the same position in the reference frame is set as the predictive vector, and the end position of the predictive vector is set to a scan start position. Scanning during searching is spirally performed from the scan start position toward the vicinity of the outside of the search range so as to locate high probability matches early in the search.

U.S. Pat. No. 6,707,853 to Cook et al. discloses a method for compensating for motion between frames in a digital video sequence for the purpose of digitally encoding the video sequence. During the method, a picture in a sequence is reconstructed by predicting the colors of pixels in pixel macroblocks using motion vectors that have previously been obtained for forward and/or backward reference pictures in the sequence.

U.S. Pat. No. 6,778,607 to Zaccarin et al. discloses a method for multi-rate encoding of video sequences. During the method, motion information relating a frame to previously-encoded frames is calculated using both spatial and frequency-domain representations of the frame and a previous frame. Motion compensation prior to encoding is performed in the frequency-domain.

U.S. Pat. No. 6,842,483 to Au at al. discloses a method for estimating motion between successive images in a digital video sequence using block-matching. During the method, a search is performed for a pixel block of a previous frame that is similar to a current pixel block of a current frame. A search area based on points in the previous frame is arranged in successively larger diamond-shaped zones. The diamond shaped zones may be centered on the corresponding position of the pixel block in the previous frame, or centered on a point that is based on a previous prediction of motion. The search in successive zones for the best matching pixel block in the previous frame continues until a threshold number of diamond shaped zones have been searched.

U.S. Patent Application Publication No. 2004/0227763 to Wichman et al. discloses a coprocessor for conducting motion estimation between frames in order to encode or decode a digital video stream. During motion estimation, one (1) motion vector over a 16×16 pixel macroblock and four (4) motion vectors over four (4) 8×8 pixel blocks in a frame are computed. The coprocessor and a processor cooperate to perform both single motion vector searches for the full macroblock and multiple motion vector searches for the four (4) 8×8 blocks.

U.S. Patent Application Publication No. 2004/0247029 to Zhong et al. discloses a method for estimating motion between frames in a digital video sequence. During the method, a plurality of predicted start motion vectors are selected. Coarse block motion searches using the plurality of predicted start motion vectors are performed to obtain a SAD value and an associated vector. A fine block motion search is then conducted using as a starting position the motion vector of the best match resulting from the coarse search. The predicted start motion vectors are preferably vectors corresponding to macroblocks both above and to the left of the current macroblock. The coarse searches are preferably 16×16 diamond searches and the fine searches include both an 8×8 search and a half-pixel search.

U.S. Patent Application Publication No. 2004/0264570 to Kondo et al. discloses a method for encoding and decoding pictures in a series of moving pictures. Storage of motion vectors used for predictive coding of pictures is controlled such that fewer motion vectors than the number of reference pictures is stored. If a required motion vector is stored, coding is conducted using the required motion vector. Otherwise, coding is performed using a motion vector corresponding to a neighboring block.

U.S. Patent Application Publication No. 2005/0179814 to Pau et al. discloses a method for de-interlacing digital images formatted according to the Phase-Alternate-Line (PAL) display system, in order to display the images on non-PAL devices.

U.S. Patent Application Publication No. 2005/0190844 to Kadono et al. discloses a method for estimating motion between frames in a digital video sequence, in order to perform compression coding of the video sequence. During the method, a reference block in a reference picture is defined as a search center. An error between a current block in a current picture and the reference block, and an error between the current block and each of neighboring reference blocks of the reference block, are then calculated. The reference block having the minimum error is identified. Based on the minimum error, it is determined whether or not motion estimation should be terminated. Based on the position of the reference block having the minimum error, a reference block removed by two pixels or more from the search center is set as the next search center, and the calculation is repeated based on the next search center. The method proceeds iteratively until the value of the newest minimum reaches a threshold value, at which point the search is terminated.

U.S. Patent Application Publication No. 2006/0002474 to Au et al. discloses a method for estimating motion of multiple frames during compression of digital video. During the method, macroblocks and their respective locations in a current frame are defined. Both a search region for each macroblock in the reference frame, and a search point for each relative displacement of a macroblock within the search region are defined. A hierarchy of modes, or levels, of possible subdivision of each macroblock into smaller, non-overlapping regions is then constructed. An "elaborated" search (i.e., a pixel-precision search) for each macroblock for the highest level of subdivision of the macroblock is then conducted to find a macroblock match. Then, a small diamond search around the motion vector obtained from the highest level elaborated search is conducted. The best motion vector for the macroblock is the motion vector corresponding to the subdivision of the macroblock in the reference frame that has the smallest mismatch measure (i.e., SAD).

U.S. Patent Application Publication No. 2006/0067406 to Kitada et al. discloses an apparatus for decoding a compression-encoded motion video stream. The apparatus implements a motion compensation procedure that generates an inter-frame prediction signal corresponding to an undecoded picture, using previously-decoded pictures. Motion vector information for generating the inter-frame prediction signal is separated from the motion video stream by an entropy decoding unit.

U.S. Patent Application Publication No. 2006/0109910 to Nagarajan et al. discloses a method for interpolating motion vectors with sub-pixel accuracy during compression coding of digital video. A block matching process for calculating a full-pixel motion vector for each block comprises comparing pixel blocks in a current frame with reference pixel blocks in a search range in a reference frame. The method by which the motion vector is interpolated is based on the orientation of the calculated full-pixel motion (i.e., horizontal, vertical or diagonal).

U.S. Patent Application Publication No. 2006/0120612 to Manjunath et al. discloses a method for estimating motion between frames in a digital video sequence during video sequence encoding. During the method, a motion vector predictor is calculated based on motion vectors previously calculated for a frame's video blocks that are proximal to the current video block. The motion vector predictor is used as a basis from which to search for a prediction video block for encoding the current video block. A difference block indicative of differences between the current video block and the prediction video block is then calculated and used to encode the current video block.

U.S. Patent Application Publication No. 2006/0126739 to Stoner et al. discloses a method for optimizing motion estimation during encoding of a digital video sequence. During the method, a SAD value is calculated between a current macroblock in a current frame and each of a plurality of reference macroblocks within a search range in a reference frame. SAD values are then calculated for all microblocks of a smallest block size within the macroblock. The SAD values of the smallest microblocks are used to calculate the SAD values for microblocks of other sizes within the macroblock (i.e., by summing the SAD values for microblocks in different combinations). The motion vectors corresponding to the lowest of the SAD values from the various-sized microblocks in each macroblock are then deemed to be the macroblock motion vectors.

While it is well-known to estimate motion between frames in a digital video sequence for encoding digital video, improved techniques for pre-compensating for perceived blur in a digital video sequence displayed on a hold-type device are desired.

It is therefore an object to provide a novel system and method for displaying a digital video sequence modified to compensate for perceived blur.

SUMMARY OF THE INVENTION

According to one aspect there is provided a system for displaying a digital video sequence, comprising:

a graphics processing unit (GPU) receiving and modifying the digital video sequence to compensate for perceived blur based on motion between frames of the digital video sequence; and a display device displaying the modified digital video sequence.

According to an embodiment, the GPU comprises a programmable fragment processor, texture memory storing frames of the digital video sequence, program memory storing a computer program executable by the programmable fragment processor. The computer program comprises program code estimating motion between pixels in a current frame and a previous frame; and program code filtering pixels in the current frame based on the estimated motion to compensate for perceived blur.

According to another aspect, there is provided a method for displaying digital video, comprising:

modifying an input digital video sequence using a graphics processing unit (GPU) to compensate for perceived blur based on motion between frames; and providing the modified digital video sequence to a display device.

According to yet another aspect, there is provided a computer readable medium having a computer program thereon that is executable by a graphics processing unit (GPU) for displaying digital video, the computer program comprising:

computer program code modifying the digital video sequence to compensate for perceived blur based on motion between frames; and computer program code providing the modified digital video sequence to a display device.

The methods and systems described herein increase the perception of sharpness in digital video displayed on a hold-type display, and do not suffer from excessive noise amplification as is common in many known inverse filtering methods. Furthermore, use of the GPU for motion estimation and compensation results in a significant performance increase over methods using only a central processing unit (CPU).

BRIEF DESCRIPTION OF THE DRAWINGS

Embodiments will now be described more fully with reference to the accompanying drawings, in which:

FIG. 5 is a table correlating the data inputs and outputs of several fragment shader programs used by the graphics processing unit of FIG. 2;

FIG. 7A is an illustrative vector field showing motion vectors of pixel blocks between two frames;

FIG. 7B is the vector field of FIG. 7A after a vector smoothing operation;

DETAILED DESCRIPTION OF THE EMBODIMENTS

For ease of understanding, perceived blur in a digital video image caused by a hold-type display such as an LCD device that uses a sample and hold display format will firstly be discussed. As a digital video sequence is input to an LCD device, each digital video image, or frame of the digital video sequence is displayed and sustained on the LCD device for one frame interval. While viewing a scene in motion, the human eyes actively track the scene with smooth pursuit eye movement so as to generate a stabilized image on the human retina, as described by M. J. Hawken and K. R. Gegenfurtner in the publication entitled "Pursuit Eye Movements to Second Order Motion Targets" (Journal of the Optical Society of America A, 18(9), pp 2292-2296, 2001). The human visual system then undertakes visual temporal low pass filtering in order to perceive a flicker-free image.

The tracking behavior of the human eye causes integration of frame data over at least one frame interval, resulting in perceived blur. The combination of the LCD device and the tracking behavior of the human visual system therefore results in a spatial low pass filtering effect. Methods for pre-compensating for motion blur in a digital image captured with a digital camera using estimates of motion direction and motion extent of the image are described in United States Patent Application Publication No. 2005/0231603, the content of which is incorporated herein by reference. Methods for pre-compensating for perceived motion blur in a digital video sequence are described in United States Patent Application Publication No. 2006/0280249, the content of which is incorporated herein by reference.

In the following description, a system and method for displaying a digital video sequence modified to compensate for perceived blur is provided. The system comprises a graphics processing unit (GPU) that receives and modifies the input digital video sequence to compensate for perceived blur based on motion between frames of the digital video sequence, and a display device displaying the modified digital video sequence.

Figure 1:
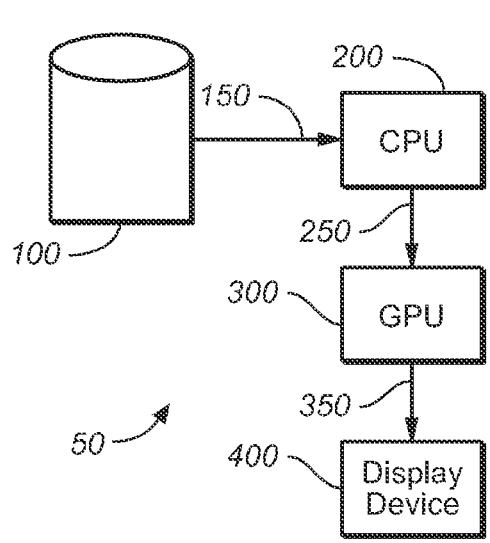
FIG. 1 is a block diagram of a system for decoding a digital video stream into a digital video sequence and displaying the digital video sequence using a display device.

FIG. 1 is a block diagram of a system 50 for displaying a digital video sequence modified to compensate for perceived blur. System 50 comprises memory 100 storing a digital video stream 150. The digital video stream 150 may be encoded according to an MPEG (Moving Pictures Expert Group) standard. A Central Processing Unit (CPU) 200 receives and decodes the digital video stream 150 into a digital video sequence 250 of frames. CPU 200 provides the digital video sequence 250 to a graphics processing unit (GPU) 300, which processes the digital video sequence 250 to compensate for perceived blur based on motion between the frames thereby to create a modified digital video sequence 350. GPU 300 provides the modified digital video sequence 350 to an LCD device 400 for display.

In this embodiment, the CPU 200 is a Pentium4 2.26 GHz system with a Windows 2000 Professional English Version operating system. The GPU 300 is a NVIDIA GeForce 6000 Series or higher, with ForceWare Graphics Driver Version 81 or higher.

Figure 2:
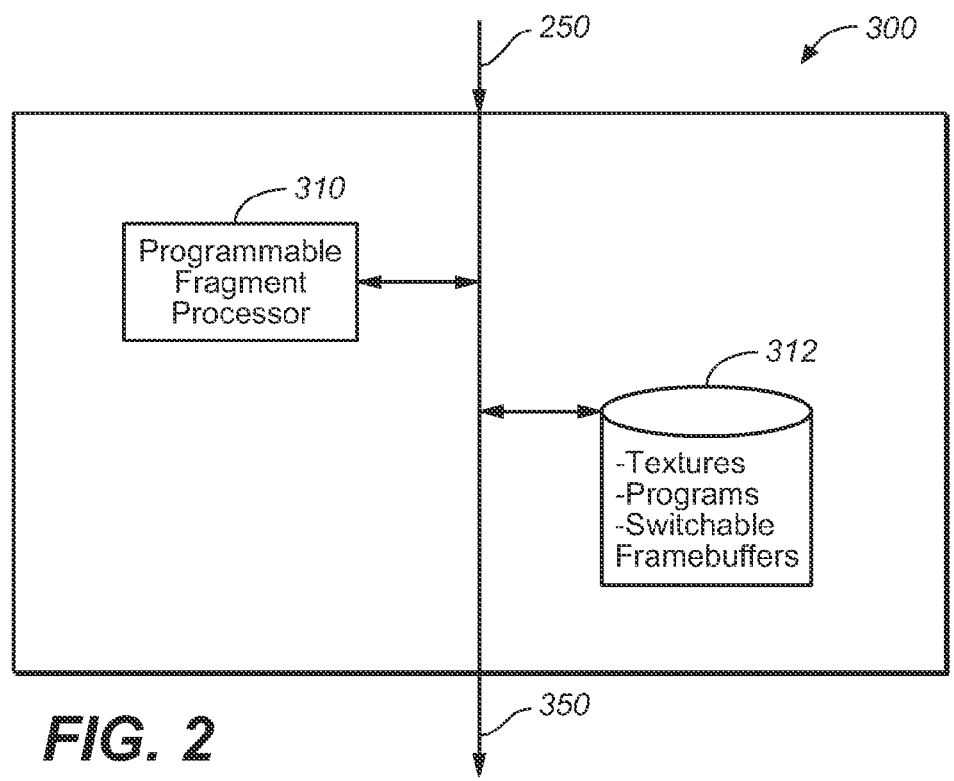
FIG. 2 is a block diagram of a graphics processing unit (GPU) in the system of FIG. 1.

FIG. 2 is a block diagram of the GPU 300. The GPU 300 includes a programmable fragment processor 310, and memory 312. Memory 312 includes data memory for three (3) textures for storing a current frame of the digital video sequence 250, a vector map lookup table, and an overdrive lookup table. Variable definitions for these textures are set out in Table 1 below:

TABLE 1

| Texture | Description |
| --- | --- |
| static GLuint m_mpegTexID | RGB Frame Data |
| static GLuint m_VectorMapTexID | Vector Map Lookup Table |
| static GLuint m_overdriveTexID | Overdrive Lookup Table |

Memory 312 also stores a framebuffer object for holding intermediate frame results during processing. The variable definition of the framebuffer object is set out in Table 2 below:

TABLE 2

| Framebuffer Object Parameters |
| --- |
| #define MQI_NUM_MIPMAP (2) |
| static CFrameBufferInterface * m_pFB[MQI_NUM_MIPMAP]; |

As will be understood, use of the framebuffer object permits direct rendering to textures. This permits increased performance because data does not have to be copied from the default frame buffer. The framebuffer object itself stores a pointer array with a base level and a block level, each with respective texture attachments. The texture attachments have 16-bit float type precision, and the RGBA color format. The RGBA color format of the texture attachments provides access to four single-channel luminance images from each texture, permitting efficient memory access.

The base level includes four (4) texture attachments for storing previous frame data, pre-processed frame results, a rendering buffer, and a frame motion vector map. Each of the base level texture attachments are the same size as a current frame. The variable definitions of the framebuffer object texture attachments are set out in Table 3 below:

TABLE 3

| Base Level Textures | Description |
| --- | --- |
| static int m_nSrcTexID | Previous Frame Data |
| static int m_nDestTexID | Pre-processed Frame Results |
| static int m_nBufferTexID | Rendering Buffer |
| static int m_nMotionTexID | Frame Motion Vector Map |

The block level of the pointer array includes three (3) texture attachments, each of which are one-eighth (⅛) the size of the current frame, for block motion estimation.

Memory 312 also includes two off-screen framebuffers. The off-screen framebuffers are used for multi-pass rendering of textures in the framebuffer objects, as will be described. Two off-screen framebuffers are required because textures in framebuffer objects cannot be read from and written to simultaneously.

Memory 312 also includes program memory for storing an OpenGL (Open Graphics Library) application written using the GLUT (OpenGL Utility Toolkit) library. OpenGL is an industry standard graphics application programming interface (API) for two-dimensional (2D) and three-dimensional (3D) graphics applications. In general, the OpenGL API processes graphics data representing objects to be rendered, that is received from a host application, and renders graphical objects on a display device for viewing by the user.

The OpenGL application includes vertex shader and fragment shader programs. General descriptions of the vertex shader programs are shown in Table 4 below:

TABLE 4

| Vertex Shader Program | Description |
| --- | --- |
| vertex_01_fourkernel | Pre-computes texture coordinates in a 2 × 2 kernel neighborhood and stores results in TEXCOORD0 |
| vertex_01_ninekernel | Pre-computes texture coordinates in a 3 × 3 kernel neighborhood and stores results in TEXCOORD0 and TEXCOORD0 |

General descriptions of the fragment shader programs are shown in FIG. 5 below:

TABLE 5

| Fragment Shader Program | Description |
| --- | --- |
| fragment_01_rgb2gray | Extracts luminance channel from RGB color space |
| fragment_02_absdiff_0 | Computes absolute difference for zero block motion vector |
| fragment_03_sumdiff_0 | Computes Sum of Absolute Difference (SAD) in block for zero block motion vector |
| fragment_04_absdiff_1 | Computes absolute difference for first-level block motion search |
| fragment_05_sumdiff_1 | Computes Sum of Absolute Difference (SAD) for first-level block motion search |
| fragment_06_absdiff_2 | Computes absolute difference for second-level block motion search |
| fragment_07_sumdiff_2 | Computes Sum of Absolute Difference (SAD) for second-level block motion search |
| fragment_08_vecmedian | Smoothes frame motion field using vector median filter |
| fragment_09_vecmap | Gets motion blur simulation parameters in lookup table |
| fragment_10_imggrad | Calculates spatial and temporal frame gradients |
| fragment_11_setweight | Sets frame pre-processing weights |
| fragment_12_simblur | Simulates perceived frame after motion blurring |
| fragment_13_update | Updates current guess to pre-compensate for motion blurring |
| fragment_14_sharpen | Sharpens frame along motion blur directions |
| fragment_15_overdrive | Performs overdrive by comparing previous and current frames |
| fragment_16_gray2rgb | Inserts pre-processed channel into RGB color space |

The vertex shader programs serve to reduce the workload of the fragment shader programs by pre-computing texture coordinates of the convolution kernels. The fragment shader programs are compiled at run-time using the known NV_fragment_program fp40 profile.

The vertex shader and fragment shader programs are written in C++ and Cg, with the C++ compiler being Microsoft Visual Studio C++ 6.0. The Cg compiler is Cg Compiler 1.4. OpenGL Version 2.0 with OpenGL Framebuffer Object Extension is employed.

Figure 3:
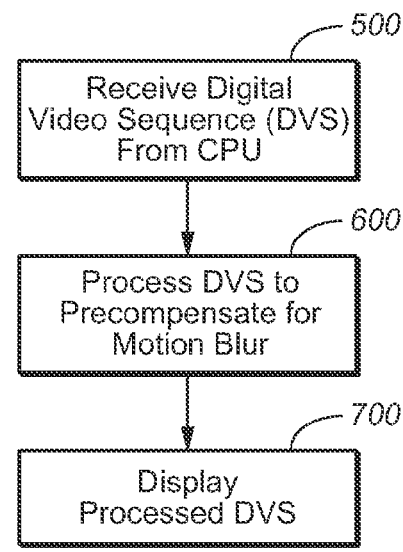
FIG. 3 is a block diagram of a method for processing and displaying a digital video sequence.

FIG. 3 shows the general steps employed by the system 50 during processing and displaying of a digital video sequence.

Initially, the vertex shader and fragment shader program code is compiled by setting up the Windows OpenGL development environment with header files gl.h, glu.h, glut.h and gltext.h, libraries opengl32.lib, glu32.lib and glut32.lib and DLLs opengl32.dll, glu32.dll and glut32.dll.

The Cg development environment is set up with header files cg.h and cgGL.h, libraries cg.lib and cgGL.lib and DLLs cg.dll and cgGL.dll. The standard GLUT display and callback functions are used to create a video playback window. Video playback is synchronized with the VSYNC signal of display device 400 if the video synchronization option is on, and otherwise may proceed as quickly as possible.

When it is desired to display a digital video sequence on the LCD device 400, the CPU 200 retrieves the digital video stream from memory 100. Once retrieved, the CPU 200 decodes the digital video stream and outputs each frame $F_n$ of the resultant digital video sequence (DVS) 250 to the GPU 200. The GPU 200 processes the frames of the DVS 250 resulting in output frames $O_n$ that are modified to compensate for perceived motion blur (step 600). The modified output frames $O_n$ form a processed DVS 350 that is displayed by the LCD device 400 (step 700).

Figure 4:
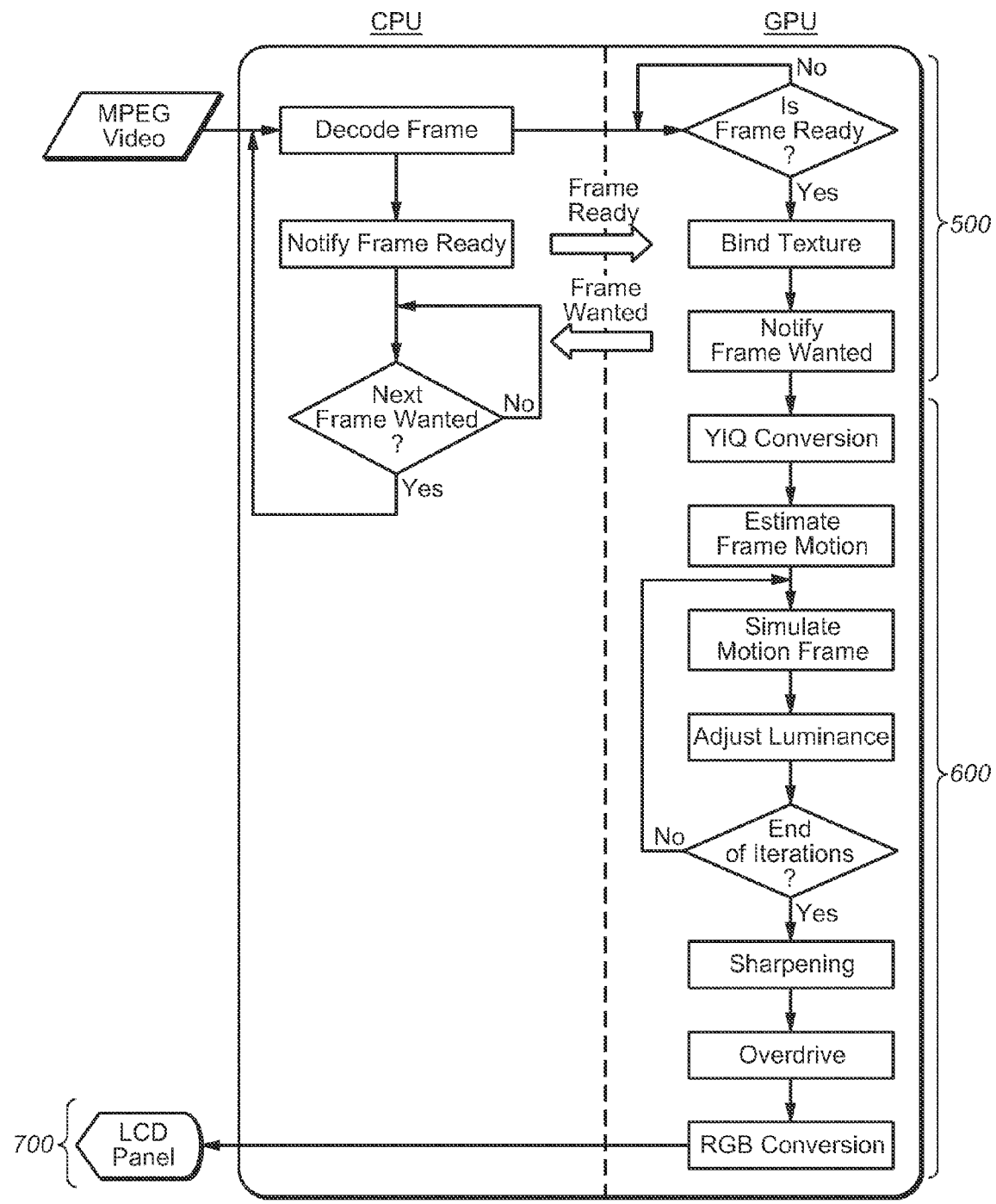
FIG. 4 is a program flow diagram showing the flow of processing operations performed on a digital video sequence frame during the method of FIG. 3.

FIG. 4 is a program flow diagram showing the flow of processing operations performed on a current frame of the DVS 250. FIG. 5 is a table correlating the data inputs and outputs of the fragment shader programs used during motion pre-compensation.

First, an MPEG decoding thread is initiated on the CPU 200, for decoding the MPEG digital video stream 150 retrieved from memory 100 into a digital video sequence 250. After each frame is decoded, the CPU 200 sets the m_FrameIsReadyEvent event flag, and waits for a m_FrameWantedEvent event flag from the GPU 300 before continuing to decode the next frame in the digital video sequence.

The GPU 300 upon receipt of a current frame, binds the current frame to texture mpegTexID, and then sets the m_FrameWantedEvent flag so as to signal the CPU 200 that another frame may be provided to the GPU 300. Using fragment shader program fragment_01_jgb2gray, the GPU 300 converts the current frame from the RGB colorspace to the YIQ colorspace using a simple linear transformation. The luminance channel of the current frame is then extracted and stored at m_nDestTexID (see Table 3 and FIG. 5). Motion between pixels in the current frame stored at m_nDestTexID and those in a previous frame stored at m_nSrcTexID is then estimated.

During estimation of the motion between pixels in the current frame and the previous frame, the current frame, having a height h and width w, is divided into b×b pixel blocks, wherein b=8 such that there are sixty-four (64) pixel blocks. A motion vector field $V_n$ having dimensions of [h/8]×[w/8] is then initialized. A search is then conducted for each pixel block in the current frame to find its best match within the previous frame.

During the search, a search window having a radius r=16 pixels and its center at the position in the previous frame corresponding to the pixel block is defined. Twelve (12) candidate motion vectors (including a zero vector) are then identified based on the search window in various directions and distances from its center. In particular, five (5) candidate motion vectors extending from the search window center in the shape of a "+" are defined at a distance of d=r/4, four (4) candidate motion vectors extending from the search window center in the shape of an "x" are defined at a distance of 2d, and four (4) candidate motion vectors extending from the search window center in the shape of a "+" are defined at a distance of 3d.

Figure 6:
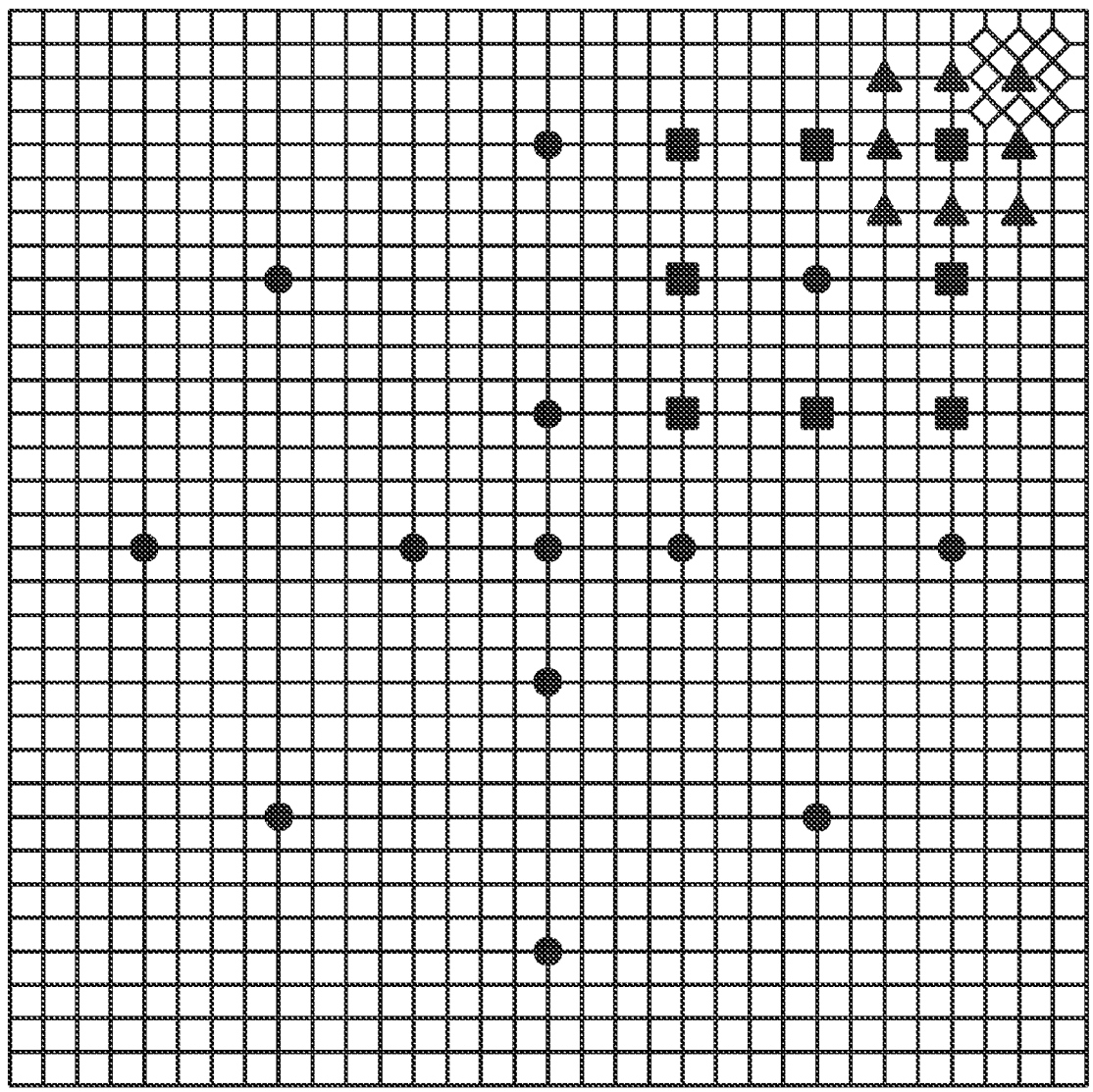
FIG. 6 is a diagram showing candidate motion vector end points used during estimation of motion of pixel blocks between digital video sequence frames.

FIG. 6 is a diagram showing end points of the candidate motion vectors used during inter-frame motion estimation of pixel blocks.

Using fragment shader programs fragment_02_absdiff_0, fragment_03_sumdiff_0, fragment_04_absdiff_1 and fragment_04_sumdiff_1 to calculate the Sum of Absolute Differences (SAD) for the zero vector and the first level block motion searches, candidate matching pixel blocks having centers defined by respective candidate motion vectors are then compared with the current pixel block in the current frame. The SAD is calculated according to Equation 1, below:

$$SAD(i, j, u, v) = \sum_{y=0}^{b-1} \sum_{x=0}^{b-1} |F_n(bi + x, bj + y) - F_{n-1}(bi + x + u, bj + y + v)| \quad (1)$$

The best match is then identified as the candidate matching pixel block that yields the lowest SAD. If the best match is the candidate matching pixel block that corresponds to the zero vector, searching is complete and motion of pixels in the pixel block is deemed to be zero. Otherwise, the search is further refined. During refinement of the search, eight (8) additional candidate motion vectors extending from the center of the best match by a distance d in respective directions are defined. Using fragment shader programs fragment_06_absdiff_2 and fragment_07_sumdiff_2, additional candidate matching pixel blocks having centers defined by respective ones of the additional candidate motion vectors are then compared with the pixel block in the current frame. If none of the additional candidate matching pixel blocks yields a SAD that is lower than that of the current best match, the current best match is considered to be the final match, and motion of the block is deemed to correspond to the candidate motion vector of the final match. Otherwise, the additional candidate matching pixel block yielding the lower SAD is deemed to be the new best match. The search is then further refined based on eight (8) additional candidate motion vectors extending from the center of the new best match by a distance d/2 in respective directions, using fragment shader programs fragment_06_absdiff_2 and fragment_07_sumdiff_2.

The process described above continues with progressive refinements using fragment shader programs fragment_06_absdiff_2 and fragment_07_sumdiff_2 and additional motion vectors extending progressively smaller distances from the centers of the previous best matches. The search is terminated either when the lengths of additional candidate motion vectors are less than one (1) pixel, or when further refinement fails to yield an additional candidate matching pixel block with a lower SAD than that of the current best match.

The position in the vector field corresponding to the block position in the current frame is then updated with the motion vector corresponding to its best match in the previous frame. The process described above is conducted for each of the blocks in the current frame.

FIG. 7A is an illustrative vector field showing motion vectors of pixel blocks between two frames. Following population of the vector field with the motion vectors corresponding to the best matches for the pixel blocks in the current frame, the vector field is then smoothed by fragment shader program fragment_08_vecmedian with a vector median filter. The result of the application of the vector median filter on the vector field of FIG. 7A is illustrated in FIG. 7B.

With a motion vector having been obtained for each pixel block, the motion vector map is complete. The fragment shader program fragment_09_vecmap then converts the motion vector map from one-eighth (⅛) the size of the current frame to the size of the current frame using bilinear interpolation of the motion vectors. Each pixel in the current frame is thereby allocated a respective motion vector having a direction and an extent.

In the event that there are no motion vectors, then no motion pre-compensation is required. In this case, the output frame $O_n$ is equal to the current frame $F_n$.

Where there has been motion estimated between the current frame $F_n$ and the previous frame $F_{n-1}$, however, motion blur pre-compensation is conducted in order to generate an output frame $O_n$ for the current frame $F_n$. The pre-compensating used by the system 50 is a modification of the technique disclosed in above-mentioned U.S. Patent Application Publication No. 2005/0231603, as will be described.

Given the current frame $F_n$ and the previous frame $F_{n-1}$, fragment shader program fragment_10_imggrad calculates both an intra-difference frame and an inter-frame differences at each pixel location, based on its respective motion vector. The differences are stored as weights for used by fragment shader program fragment_11_setweight to set the amount of correction to be performed on each pixel.

A filter bank is constructed and, for each motion vector, a linear blurring filter $f_k$ is created with size $s_k$ and direction $\theta_k$ corresponding to the respective motion vector, and added to the filter bank. For example, where K=2, a first of the two (2) blurring filters $f_1$ based on a motion vector with direction $\theta_1=0°$ and extent $s_1=5$ pixels would be as follows:

$$f_1 = \boxed{0.2\,|\,0.2\,|\,0.2\,|\,0.2\,|\,0.2}$$

The second of the two (2) blurring filters $f_2$ based on a motion vector with direction $\theta_2=90°$ and extent $s_2=3$ pixels would be as follows:

$$f_2 = \begin{array}{|c|}\hline 0.33 \\\hline 0.33 \\\hline 0.33 \\\hline\end{array}$$

An initial guess frame is established by setting the current frame $F_n$ as the initial guess image for output frame $O_n$. A guess pixel is selected from the guess image and a blur filter corresponding to the guess pixel is retrieved from the filter bank. If the blur filter does not have an extent that is at least one (1) pixel, then the next pixel is selected. Otherwise, the edge magnitude of the guess pixel is estimated in the motion direction of the blur filter using a Sobel edge filter, and stored as a weighting factor in $W_n(x,y)$. The Sobel edge filter operation and weighting is conducted according to Equations (2), (3) and (4) below:

$$dx = O_n(x,y) \otimes \begin{bmatrix} -1 & 0 & 1 \\ -2 & 0 & 2 \\ -1 & 0 & 1 \end{bmatrix} \quad (2)$$

$$dy = O_n(x,y) \otimes \begin{bmatrix} -1 & -2 & -1 \\ 0 & 0 & 0 \\ 1 & 2 & 1 \end{bmatrix} \quad (3)$$

$$W_n(x,y) = \cos \cdot dx(x,y) + \sin \cdot dy(x,y) \quad (4)$$

The guess pixel is then blurred using the blur filter by convolving the output frame pixel $O_n(x,y)$ with the filter $f_k$ to obtain blurred pixel $B_n(x,y)$. An error between the pixel in the frame $F_n$ and the blurred guess pixel is determined by subtracting the blurred pixel $B_n(x,y)$ from the current frame pixel $F_n(x,y)$ to obtain error $E_n(x,y)$. Error $E_n(x,y)$ is then blurred using the blur filter $f_k$, and weighted using the edge magnitude that had been obtained as a weighting factor. The guess pixel is then updated with the weighted and blurred error according to Equation (5) below:

$$O_n(x,y) = O_n(x,y) + \beta \times E_n(x,y) \times W_n(x,y) \quad (5)$$

where:

$\beta$ is a constant step size.

If there are more pixels to select in the guess image, then the next pixel is selected for pre-processing as described above. Otherwise, the total adjustment to output frame $O_n$ across all pixels is calculated to determine the overall difference $\Delta E$ between the guess image and the current frame $F_n$ as calculated across all pixels according to Equation (6) below:

$$\Delta E = \sum_y \sum_x [\beta \times E_n(x,y) \times W_n(x,y)] \quad (6)$$

If the overall difference $\Delta E$ is below a pre-defined error threshold, then pre-compensation is complete for the current frame $F_n$. The resultant output frame $O_n$ is sharpened with fragment shader program fragment_14_sharpen using a directional sharpening filter tuned to the motion direction at each pixel location, and stored in rendering buffer m_nBufferTexID. Otherwise, a pixel in the updated guess image is selected and the process described above is re-iterated until complete.

Once the sharpening operation on output frame $O_n$ has been completed, an overdrive operation is performed using fragment shader program fragment_15_overdrive. The results of the overdrive operation are stored as pre-processed frame results in m_nDestTexID. Overdrive provides additional compensation for the relatively slow response time of a hold-type device. During overdrive, the driving voltage applied to each device pixel is adjusted by an amount proportional to a gray level transition. This technique is described by H. Okurama, M. Akiyama, K. Takotoh, and Y. Uematsu in the publication entitled "A New Low Image-Lag Drive Method For Large-Size LCTVs," (SID'02 Digest, pp. 1284-1287, 2002).

Once overdrive has been completed on output frame $O_n$, the fragment shader program fragment_16_gray2rgb inserts the output frame $O_n$ into the luminance channel Y of the YIQ frame stored at mpegTexID, converts the frame into RGB color space and provides the modified RGB frame data to the LCD device 400.

The two off-screen framebuffers are used to achieve multi-pass rendering by swapping the source and target texture IDs at the end of each rendering pass. In this way, the target texture from the first pass is used as the source for the second pass.

Performance of the system 50 has been found to be better than that provided by systems employing only a CPU for motion pre-compensating. The test environment used to evaluate the performance of the system 50 included a Pentium4 2.26 GHz CPU with a Windows 2000 Professional English Version operating system, 256 MB RAM, and a bus speed of 266 MHz. GPU was a NVIDIA GeForce 6600 Series GPU, with 256 MB DDR RAM. Metrics were obtained using the performance counter function provided by the kernel32.lib library, and results were verified using the gDEBugger OpenGL profiler version 2.3. For each evaluated implementation option, the time taken to process 100 frames of a test video sequence was measured. Each video sequence was measured five times, and the average frame processing time was captured.

Five (5) video sequences were used during performance evaluation. These were:

1. A 'Foreman' real video sequence of a static background with a subject moving in the foreground and having a resolution of 176×144 pixels;

2. A 'Vision Chart' animated video sequence of a vision chart in various font sizes scrolling from left to right under constant motion and having a resolution of 256×192 pixels;

3. A 'Road' real video sequence of a camera panning from left to right capturing the motion of a fast-moving vehicle and having a resolution of 320×240 pixels;

4. A 'Football' real video sequence of multiple fast-moving subjects in the foreground and having a resolution of 352×240 pixels; and 5. A 'TwoDogs' real video sequence of two dogs moving in different directions and having a resolution of 640×480 pixels.

All real video sequences were saved in MPEG format, while the animated sequence was created by causing a BMP image to move using DirectX and saving the result to an MPEG file. A frame rate of 30-fps (frames per second) was used in all of the test video sequences.

Figures 8, 9, 10:
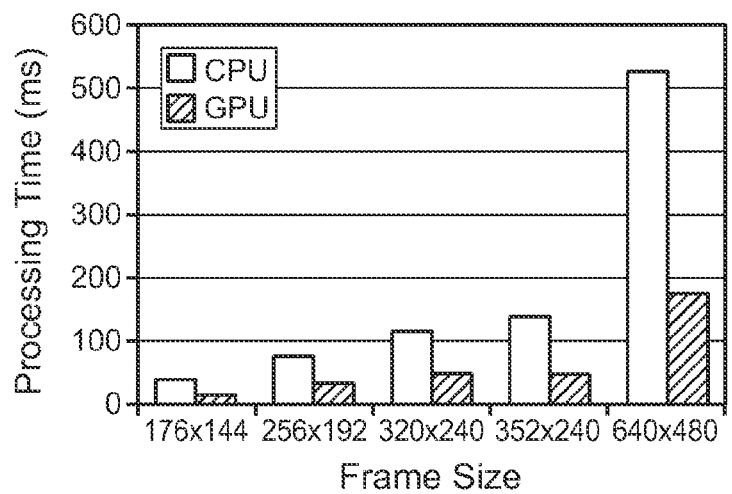
FIG. 8 is a graph illustrating the differences in overall processing times between a central processing unit (CPU) and a GPU during motion blur pre-compensation.
FIG. 9 is a table correlating the overall processing times of FIG. 8 with processing times per frame and frame rates.
FIG. 10 is a table including the differences between a GPU and a CPU in the individual processing times of various processing operations during motion blur pre-compensation.

The total individual processing times taken by the GPU and the CPU to complete all operations in the algorithm were compared. These operations included: colorspace conversion, motion estimation, motion blur compensation, motion sharpening and overdrive. FIG. 8 is a graph illustrating the differences in overall GPU and CPU processing times during modification of frames to compensate for perceived blur, for several frame sizes. FIG. 9 is a table correlating the overall GPU and CPU processing times of FIG. 8 with processing times per frame and frame rates. Overall, the GPU implementation yielded a performance speed-up factor of about 2.5 times over the counterpart CPU implementation. Performance speed-up became more pronounced as the frame size increased.

Figure 11:
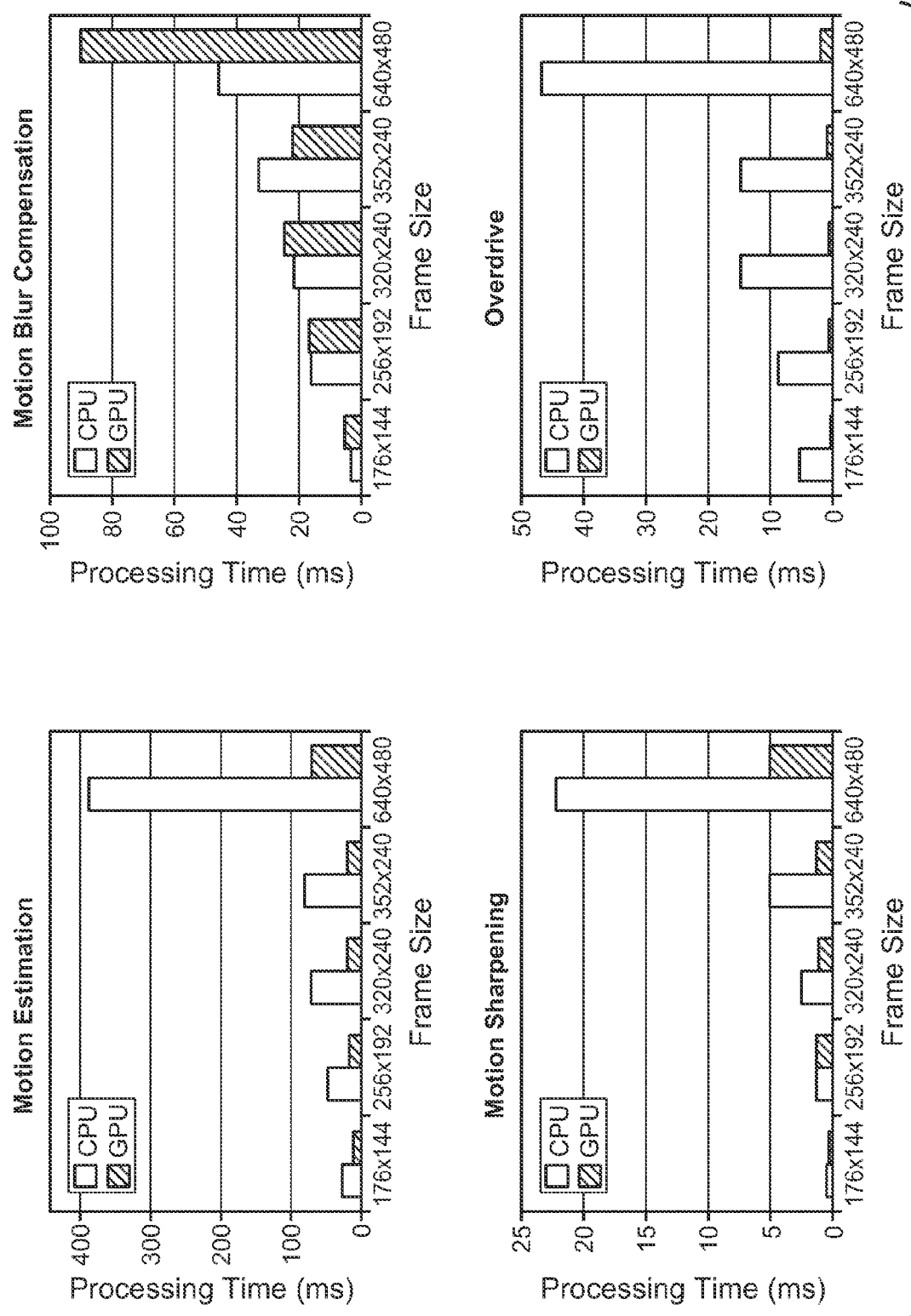
FIG. 11 is a set of graphs illustrating the differences in individual processing times of various processing operations of FIG. 10.

FIG. 10 is a table including the differences in individual GPU and CPU processing times for various processing operations during modification of frames to compensate for perceived blur. FIG. 11 is a set of graphs illustrating the differences in individual GPU and CPU processing times for the various processing operations of FIG. 10. From these above comparison graphs and tables, it was observed that the most significant performance gain occurred during motion estimation, which yielded a five times increase on average. In addition, operations that were highly uniform across all pixels, such as overdrive, clearly benefitted from the GPU parallel processing architecture.

It was observed that, in most cases, it took longer to complete the actual motion blur compensation on the GPU than on the CPU. This could be due to additional data copying time in the GPU implementation during use of the off-screen render targets, which are either read-only or write-only. Other reasons may include the overhead imposed on the iterative rendering process by having to swap between different frame buffers. Furthermore, in the GPU implementation, the motion vector is stored separately for each pixel which, while yielding smoother results, inherently increases the time required for texture fetch.

Although a specific embodiment has been described above with reference to the Figures, it will be appreciated that alternatives are possible. For example, while pixel block sizes of 8×8 for block motion estimation were described, larger or smaller block sizes may be selected, having an according effect on the processing time vs. performance trade-off.

Alternatives to the criterion described above for determining that iterative pre-compensation is complete, whereby it is determined whether the sum of pixel error has changed by more than a threshold amount, may be employed. For example, the pixel blurring, comparing, error pixel blurring and weighting, and combining may be performed iteratively a predetermined number of times, as required to suit the particular implementation.

Although embodiments have been described, those of skill in the art will appreciate that variations and modifications may be made without departing from the spirit and scope of the invention defined by the appended claims.

What is claimed is:

1. A system for displaying a digital video sequence, comprising:

a graphics processing unit (GPU) receiving and modifying the digital video sequence to compensate for perceived blur based on motion between frames of the digital video sequence; and a display device displaying the modified digital video sequence: and wherein the GPU comprises:

a programmable fragment processor;

texture memory storing frames of the digital video sequence; and program memory storing a computer program executable by the programmable fragment processor, the computer program comprising:

program code estimating motion between pixels in a current frame and a previous frame; and program code filtering pixels in the current frame based on the estimated motion to compensate for perceived blur; and wherein the texture memory further stores a vector map lookup table and an overdrive lookup table.

2. The system of claim 1, wherein the GPU further comprises:

framebuffer object memory storing intermediate frame processing results of estimating and filtering by the computer program.

3. The system of claim 2, wherein the framebuffer object memory further stores a pointer array having a base level and a block level.

4. The system of claim 3, wherein the base level comprises four texture attachments each being the same size as the current frame.

5. The system of claim 4, wherein the block level comprises three texture attachments each being a fraction of the size of the current frame.

6. The system of claim 5, wherein the block level texture attachments are one-eighth (⅛) the size of the current frame.

7. The system of claim 1, wherein the estimating motion program code and the filtering pixels program code comprise:
fragment shader program code; and
vertex shader program code.

8. The system of claim 1, wherein the GPU comprises:
a plurality of off-screen frame buffers receiving filtered frames for display by the display device.

9. The system of claim 1, further comprising:
a central processing unit (CPU) decoding a digital video stream into the digital video sequence and providing frames of the digital video sequence to the GPU.

10. A method for displaying digital video, comprising:
modifying an input digital video sequence using a graphics processing unit (GPU) to compensate for perceived blur based on motion between frames; and
providing the modified digital video sequence to a display device; and
wherein the modifying comprises:
estimating motion of pixels between frames in the digital video sequence; and
filtering frames based on the estimated motion; and
wherein the estimating comprises:
estimating a motion vector between a current frame and a previous frame for each of a plurality of pixel blocks of said current frame thereby to obtain a block motion vector field, wherein a block motion vector represents a respective estimated blur direction and blur extent;
smoothing the block motion vector field; and
allocating to each pixel in the current frame, the block motion vector of its corresponding block in the smoothed block motion vector field.

11. The method of claim 10, wherein the filtering comprises:
generating an initial guess frame based on the current frame;
blurring pixels in the guess frame as a function of their respective estimated blur directions and blur extents;
comparing each blurred pixel with a respective pixel in the current frame to generate an error pixel for each respective pixel;
blurring and weighting each error pixel; and
combining each error pixel and its respective pixel in the initial guess frame thereby to update the guess frame and compensate for blur.

12. The method of claim 11, wherein the weighting is a function of the respective pixel motion.

13. The method of claim 12, wherein the weighting is an estimate of the edge magnitude of the respective pixel in the guess image in the direction of pixel motion.

14. The method of claim 13, wherein the edge magnitude is estimated using a high-pass filter.

15. The method of claim 11 wherein the initial guess frame is the current frame.

16. The method of claim 15, wherein the weighting is an estimate of the edge magnitude of the respective pixel in the guess frame in the direction of pixel motion.

17. The method of claim 12 wherein the pixel blurring, comparing, error pixel blurring and weighting, and combining are performed iteratively.

18. The method of claim 17 wherein the pixel blurring, comparing, error pixel blurring and weighting, and combining are performed iteratively until the sum of error falls below a threshold level.

19. The method of claim 17 wherein the pixel blurring, comparing, error pixel blurring and weighting, and combining are performed iteratively a predetermined number of times.

20. The method of claim 17 wherein the pixel blurring, comparing, error pixel blurring and weighting, and combining are performed iteratively until the sum of error fails to change by more than a threshold amount between successive iterations.

21. A non-transitory computer readable medium having a computer program thereon that is executable by a graphics processing unit (GPU) to perform the following:
modifying the digital video sequence to compensate for perceived blur based on motion between frames; and
providing the modified digital video sequence to a display device; and
wherein the modifying comprises:
estimating motion of pixels between frames in the digital video sequence; and
filtering frames based on the estimated motion; and
wherein the estimating comprises:
estimating a motion vector between a current frame and a previous frame for each of a plurality of pixel blocks of said current frame thereby to obtain a block motion vector field, wherein a block motion vector represents a respective estimated blur direction and blur extent;
smoothing the block motion vector field; and
allocating to each pixel in the current frame, the block motion vector of its corresponding block in the smoothed block motion vector field.

* * * * *